United States Patent [19]
Hemphill

[11] 3,720,827
[45] March 13, 1973

[54] LIGHT TRANSMITTING FOAM PLASTIC LENSES

[75] Inventor: John M. Hemphill, Lancaster, Pa.

[73] Assignee: Armstrong Cork Company, Lancaster, Pa.

[22] Filed: Dec. 28, 1970

[21] Appl. No.: 101,459

[52] U.S. Cl. .................... 240/46.59, 240/106
[51] Int. Cl. ................................. F21v 9/08
[58] Field of Search .......... 240/46.59, 46.51, 106

[56] References Cited

UNITED STATES PATENTS

| | | | |
|---|---|---|---|
| 2,957,791 | 10/1960 | Bechtold | 96/87 R X |
| 3,177,109 | 4/1965 | Ziegler | 161/161 |
| 3,222,515 | 12/1965 | Orr | 240/106 |

Primary Examiner—Samuel S. Matthews
Assistant Examiner—Richard L. Moses
Attorney—Clifford B. Price

[57] ABSTRACT

Foam plastic lenses may be used to form lenses for light fixtures. The voids in the lens tend to diffuse the light. By selectively affecting the voids in different areas of the lens, a wide range of unique patterns can be created from an otherwise uniform and visually and stylistically uninteresting foam sheet. Patterns are provided by embossing or vacuum forming the lens in selected portions.

1 Claim, 3 Drawing Figures

PATENTED MAR 13 1973          3,720,827
Fig. I
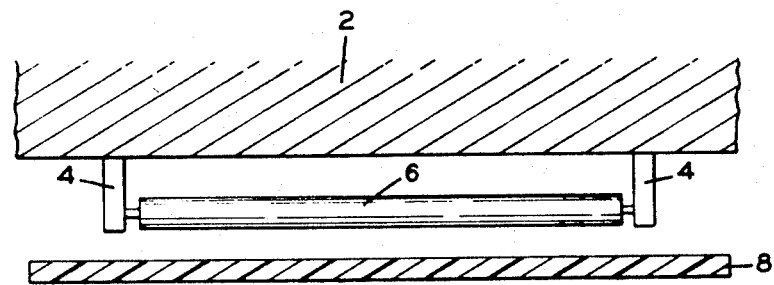
Fig. II
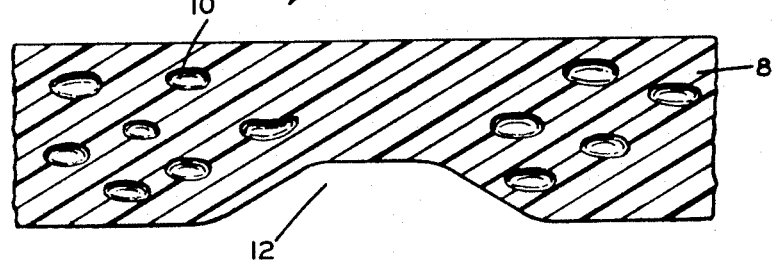
Fig. III
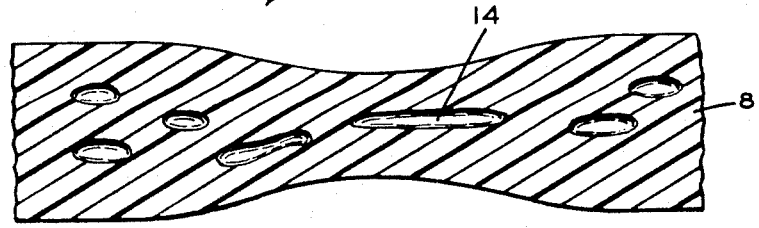
INVENTOR
JOHN M. HEMPHILL
BY  *Clifford B. Price*
ATTORNEY

LIGHT TRANSMITTING FOAM PLASTIC LENSES

BACKGROUND OF THE INVENTION

Field of the Invention

The invention relates to lenses for luminaires and, more particularly, to a foam plastic lens for a luminaire with a decorative pattern provided in the lens.

Cross-Reference to Related Application

This application is an improvement over the lens set forth in application Ser. No. 886,464, filed Dec. 19, 1969, entitled "Foam Plastic Lens for a Luminaire".

Description of the Prior Art

The technique for making and the characteristics of a foam plastic lens for use with a luminaire are set forth in the above-mentioned patent application. The lens is made of a plastic containing a number of voids which exist due to the mixing of a blowing agent with the material to form the extruded lens. The lenses of the above application were developed to replace conventional lenses which are normally provided with ridges or other configurations which tend to provide a plurality of interfaces in the material for the purpose of diffusing or directing the light coming from the lamps. Normally, a decorative effect has never been provided to a lens. The lens may be provided with a grid-type pattern or a plurality of ridges, but lenses are not provided with a designed unique pattern effect to provide interesting styling effects. Furthermore, the provision of these styling effects in the structure of the above-mentioned patent application provides for a change in light transmitting characteristics of the foam, and this highlights the design in the lens.

SUMMARY OF THE INVENTION

The lens is formed in the manner mentioned in the copending application and has the structure as set forth in that application. After the lens is formed, it is then provided with its pattern effect. Two major techniques are utilized to provide the patterns. The pattern techniques may be simply provided in the flat sheet or the flat sheet itself may be converted into a three-dimensional structure. The first technique is that of vacuum forming, which can selectively stretch the sheet in specific areas to enlarge the voids and decrease the thickness of the sheet and therefore increase its light transmission. The second technique involves the embossing under heat and pressure of certain selected areas of the lens, and this eliminates most of the cells and reduces sheet thickness to thus increase light transmission.

BRIEF DESCRIPTION OF THE DRAWING

FIG I is a side view of a luminaire with a lens structure;

FIG. II is an enlarged cross-sectional view of a lens structure made by one technique; and FIG. III is an enlarged cross-sectional view of a lens structure made by another technique.

DESCRIPTION OF THE PREFERRED EMBODIMENT

The basic lens is made by the technique set forth in the above-mentioned copending application Ser. No. 886,464. The lens is then modified by the below-described techniques. The lens is then utilized in the structure of FIG. I. Referring now to FIG. I, there is shown a support 2 which carries end mounts 4 for a fluorescent tube 6. Positioned in front of the fluorescent tube 6 is a lens 8. This foam lens 8 is between the fluorescent tube 6 and an observer.

Referring now to FIGS. II and III, there is shown enlarged cross-sectional views of the lens structure 8. The bubble structure of voids 10 of the lens are clearly visible. In the patterned areas, there is a change in the structure of the lens, and this is due to the particular technique being used to provide decorative designs on the lens structure.

Referring now to FIG. II, there is shown a lens structure which has been embossed under heat and pressure. The lens element is placed in a pattern die. Under a pressure of 2000 psi and a temperature of 190° Fahrenheit, the patterned impression of the die acts upon the lens to provide the lens with a patterned configuration. In FIG. II the depressed area 12 is a portion of pattern which has been placed in the lens 8. Where the pattern is provided, there is compression of the lens material. Due to the heat and pressure, there is elimination of most or all of the cell structure in the region where the embossing is provided. This embossing also reduces the sheet thickness at the point of embossing. Both the reduction of the sheet thickness and the removal or lessening of the voids, which tend to diffuse light, result in an increase in the light transmission of the lens in the region where the embossing occurred. Thus not only is the surface of the lens provided with a decorative pattern, but this pattern is highlighted due to a change in the light transmission of the sheet between the decorative areas and the nondecorative areas.

Referring now to FIG. III, there is shown a cross-sectional view of a lens 8 which has been affected by the second technique for providing the decorative pattern. Again, a mold with a pattern is provided. However, instead of using a pressure-temperature die, a vacuum forming die is utilized. Here a vacuum on one side of the die and atmospheric pressure on the other side of the die, with some selective heating, results in the forming of the lens 8 into the pattern which exists in the die of the vacuum former. Heat is provided at a temperature of 250 degrees Fahrenheit. When the sheet is altered to assume the pattern of the vacuum forming die, there is a selective stretching of the sheet in specific areas. This occurs because the sheet is assuming the pattern of the die. In those areas where there is selective stretching, there is an enlarging of the cell structure 14 and also a decreasing in the thickness of the sheet 8. The enlarging of the cell structure results in an increase in the major dimension of the cell structure, that is, along the sheet dimension, and a narrowing of the cell structure across the sheet dimension. Again, the feature of change of the cell structure plus a reduction in the sheet thickness results in an increase in the light transmission. This thus gives you a lens with a change in its surface due to a pattern configuration and a highlighting of the pattern due to the change of light transmission between the pattern and nonpatterned areas

What is claimed is:

1. In combination, a luminaire with a light source therein and a lens positioned between the light source and an observer of the luminaire, said lens being formed of a foam, closed-cell plastic material, said cells having walls which form a plurality of interfaces to diffuse light coming from the light source, a pattern provided in at least one surface of the lens so as to change the thickness and other characteristics of the lens structure to provide the lens with a surface configuration which is depressed in the pattern areas, and said closed-cell structure is altered in the depressed areas to provide a cell structure which is enlarged over that of the cell structure of the non-pattern areas to provide for a light transmission characteristic in the pattern areas which is different from that of the non-pattern areas.

* * * * *